United States Patent
Av et al.

(10) Patent No.: US 12,346,216 B2
(45) Date of Patent: Jul. 1, 2025

(54) SYSTEM AND METHOD TO PERFORM CHANGED SECTOR BACKUPS ON A VOLUME

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/363,598

(22) Filed: Aug. 1, 2023

(65) Prior Publication Data

US 2025/0045169 A1    Feb. 6, 2025

(51) Int. Cl.
*G06F 11/14*    (2006.01)

(52) U.S. Cl.
CPC ...... *G06F 11/1453* (2013.01); *G06F 11/1451* (2013.01)

(58) Field of Classification Search
None
See application file for complete search history.

(56) References Cited

U.S. PATENT DOCUMENTS 10,078,555 B1 * 9/2018 Kumar .................. G06F 16/188

* cited by examiner

*Primary Examiner* — Brian R Peugh
(74) *Attorney, Agent, or Firm* — Staniford Tomita LLP (57) ABSTRACT

Performing changed sector backups on a volume to improve the throughput of incremental backups for block-based backups by overwriting only modified data on each changed block. Latency reduction is achieved by not overwriting the changed block as a whole. The previous backup is cloned and the batch file in the clone is updated by considering the incremental block extents. The incremental data write is performed only on the changed data of each incremental block from a couple of offset values from the previous backup's clone. Dynamic disk rather than differencing disk containers are used for snapshots. Use of a previous backup clone eliminates the need for temporary virtual disk containers, and fixed-size segmentation at the target reduces fragmentation and eliminates the need to enforce variable-sized segmentation.

20 Claims, 5 Drawing Sheets

SYSTEM AND METHOD TO PERFORM CHANGED SECTOR BACKUPS ON A VOLUME

TECHNICAL FIELD

Embodiments are generally directed to large-scale backup systems and more specifically to performing changed sector backups on a volume for block-based backups.

BACKGROUND

Data protection involves backing up data for storage and restoration in case of system failure. Data can be copied or cloned from a data source (backup client) to a storage target through a backup server. For any backup scenario at customer site, determining the amount of data changes between backups and assuring an incremental backup with maximum throughput is a requirement for modern data protection software. For systems with a great number and variety of data items on a particular storage media, it is a challenge to determine precise changes on particular sectors of a disk array for a specific file. It is also a challenge to write those changes exclusively to the target object with minimum latency.

Conventionally, file system backups determine the sequence of bytes of files on the disk and read them in a sequence to achieve a meaningful write operation. Modern block-based backups (BBB) eliminate the need to determine the sequence of file bytes on the disk, as the blocks would be read as they are on the disk, thereby limiting the time to determine the sequence. However, such systems are suboptimal in the way that blocks are being read for incremental changes, and the way incremental blocks are being written to the storage media.

What is needed, therefore, is a modified BBB technology that improves the throughput of the incremental backups, such as by exclusively overwriting the modified data on each changed block.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments reduce inherent latencies associated with gaps in data savesets created by present block-based backup methods. A BBB driver provides a bitmap for the entire volume of changes to be saved in an incremental backup. The changes are calculated for each file to be backed up by utilizing the volume offsets in the container. A container stream is created containing the list of incremental extents for each file, which encapsulates the complete file extents and snapshot file handle. The saveset file of the last backup is cloned using storage target APIs. This cloned backup file is further overwritten with the changes to update a virtual disk header and metadata for the new backup. Subsequently, a block start for each incremental extent is calculated, and the BAT table of the cloned backup is updated with these details. For each incremental block in the extents list, an entry for the block would be checked in the BAT table. If the entry exists, VHDX offset for the block would be fetched, otherwise a new block would be created and a new entry for the block added in the BAT table.

A system includes a changed sector backup process for block-based backups that utilizes the dynamic disk containers, changed data detection in a block, and fixed-size segmentation (FSS) in a conjunction to improve the backup performance. This is used to fill gaps in conventional virtual synthetic full (VSF) backups that are due to the fact that the backup merger was performed for each block write operation, and a differential disk type container was used, which takes extra time to deploy as a temporary container. The systems utilizes these potential gaps to gain the lost time back so as to ultimately achieve an efficient backup that provides users with improved backup windows.

The system creates one dynamic disk container instead of an additional temporary container, and modifies the BAT of this same container. Whenever, there is a new block entry, there would be an entry for the corresponding virtual disk container offset in the BAT table. Finally, in each changed block, only the changed data is replaced, unlike conventional backups that write the whole changed block irrespective of data changes in a temporary differential disk. This system overwrites only the changed bits in the dynamic disk.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements, such as possible recovery point objectives (RPO) and recovery time objectives (RTO) with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Figure 1:
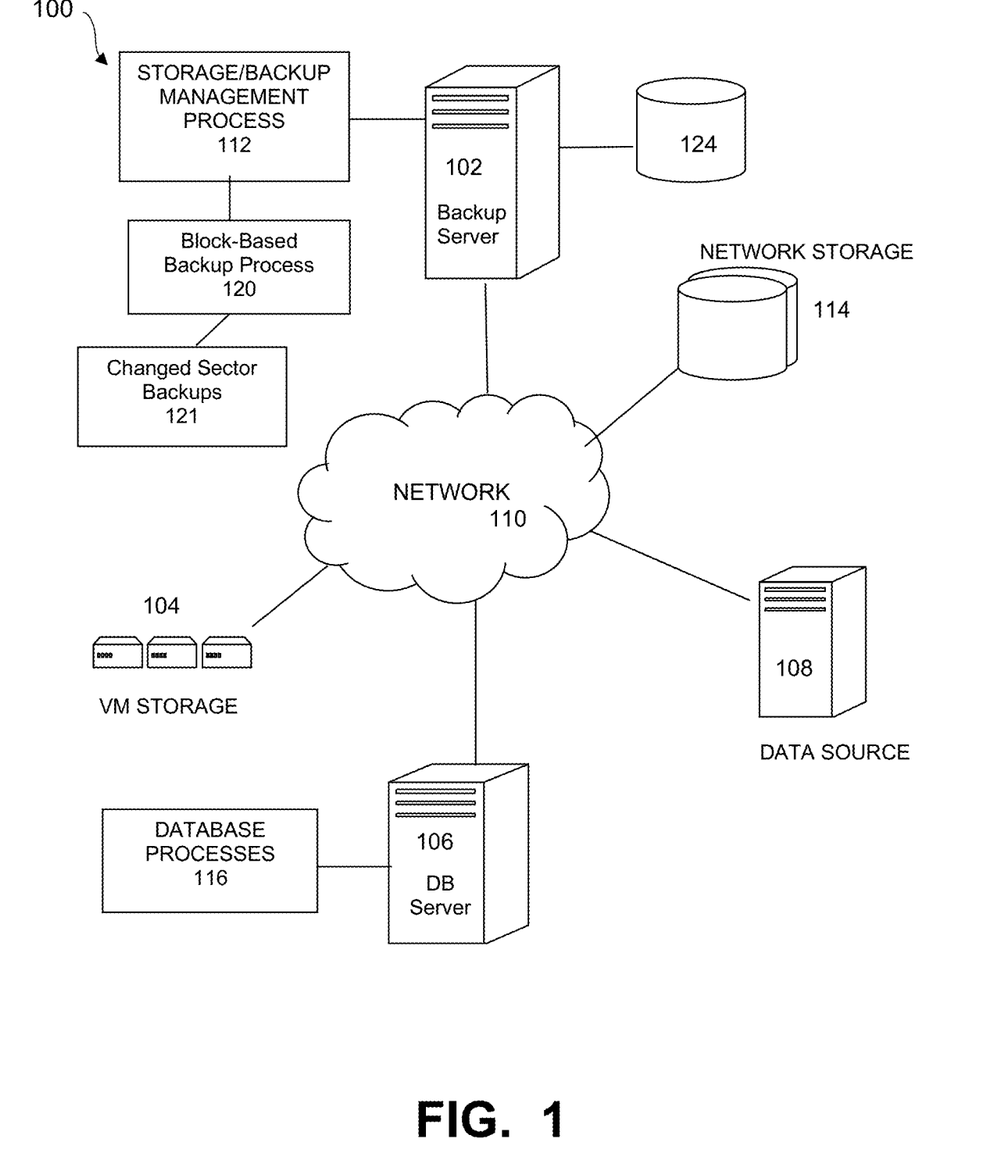
FIG. 1 illustrates a computer network system that implements one or more embodiments of a backup system implementing an improved method of performing changed sector backups on a volume.

FIG. 1 illustrates a computer network system that implements an improved method to perform changed sector backups on a volume for block-based backups. In system 100 of FIG. 1, a storage server 102 executes a data storage or backup management process (or "backup program") 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources 108 in the network. The data sourced by the data source (serving as a 'backup client') may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 facilitates the backup of this data to other storage devices of the network, such as network storage 114 or cloud storage in network 110. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The backup management process 112 may implement certain backup policies to help users meet certain RTO and RPO objectives. These policies are defined by the user or system administrator and specify various operational parameters of the backup jobs. For example, policies dictate which data clients or data assets are backed to which storage targets, how often the backups are made, and any special processing, such as encryption, and so on. Many different policies may be defined for the various data sources, assets, and storage targets in the system.

Figure 2:
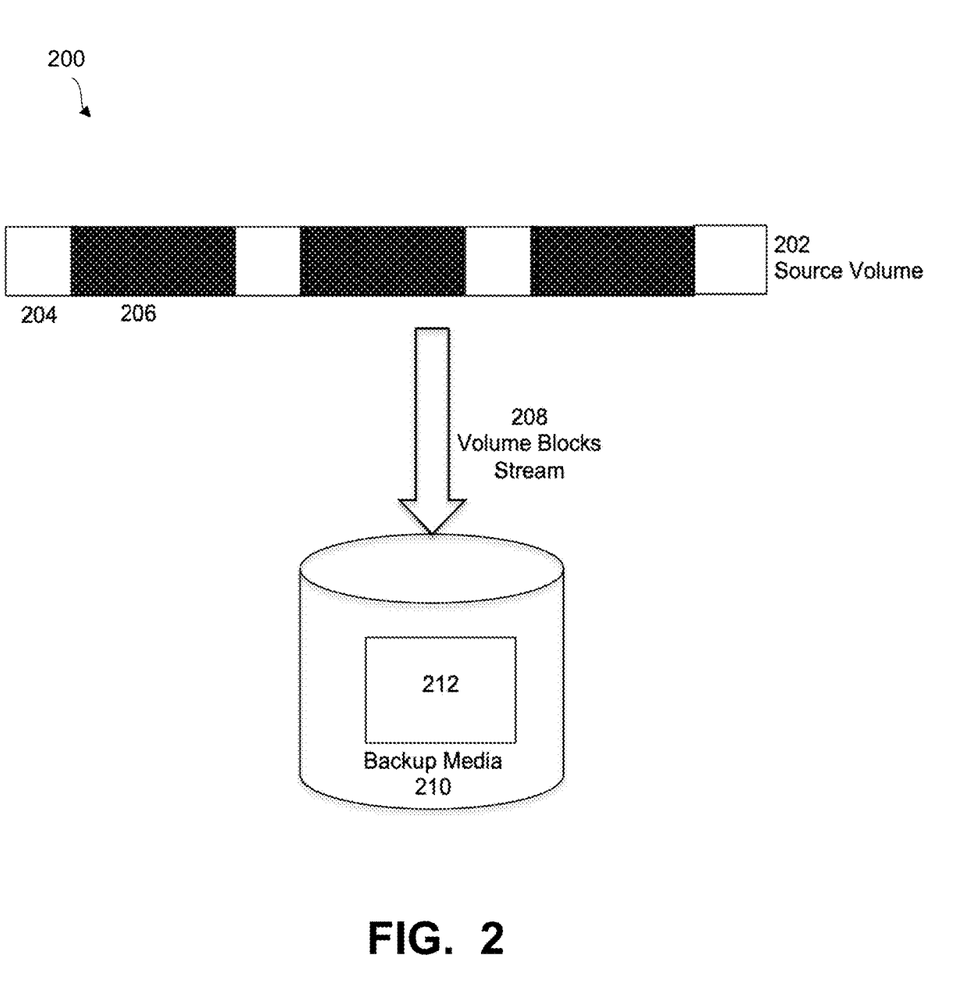
FIG. 2 illustrates an example block based backup operation, in accordance with some embodiments.

In an embodiment, backup process 112 implements block-based backups 120. FIG. 2 illustrates an example block based backup operation, in accordance with some embodiments. As shown in FIG. 2, a source volume 202 comprises a number of used blocks 204 and unused blocks 206. During a backup process, the blocks of the source volume 202 are streamed 208 to the backup media 210 to produce backup saveset 212 comprising the backup of the source volume on the backup disk or virtual hard disk (VHD or VHDX). In a block based backup system, the backup process reads the used blocks 204 in the order that they are on the source disk, not the order that they appear in files, which tend to be heavily fragmented, due to file system storage that scatters blocks of a file across the disk. Block based backups bypass the file system and read data directly form the source disk or volume. Block based backup applications can either read data in the same sized blocks as the file system or in different sized blocks. These used blocks are embedded as payload blocks in a virtual disk format such as VHDx and stored as backup savesets. BBB may be faster than standard backups because only the blocks that contain data are backed up, rather than the entire files, however, it may not be as useful when backing up a portion of files or folders on a volume.

System 100 also includes process 121 to perform changed sector backups on a volume to improve the throughput of the incremental backups by BBB 120 by exclusively overwriting the modified data on each changed block. This solution ensures that there is a potential latency reduction by not overwriting the changed block as a whole. Under this method, the previous backup would be cloned and the BAT file in the clone is updated by considering the incremental block extents. The incremental data write is performed only on the changed data of each incremental block from a couple of offset values from the previous backup's clone. Ultimately, this ensures that the block overwrite is kept minimal with the proposed format of incremental writes.

A BAT file is a Microsoft Windows executable batch file, where such a file is named using .bat as an extension. Any commands that are given to windows command line or any special instructions or any journaling information can be stored in this single file and can be processed or executed at a time concurrently by a master program. The term 'BAT file' as used herein means any executable batch or script file.

In general, the backup window is a most crucial attribute for any backup administrator in present data protection scenarios. Most organizations tend to align towards a product that has its bell curve tapering towards the backup window, while retaining the best possible RPO (recovery point objective) and RTO (recovery time objective). With the trends in data protection, decreasing the backup windows with minimum performance penalty on the source host has been an increasing challenge.

Figure 3:
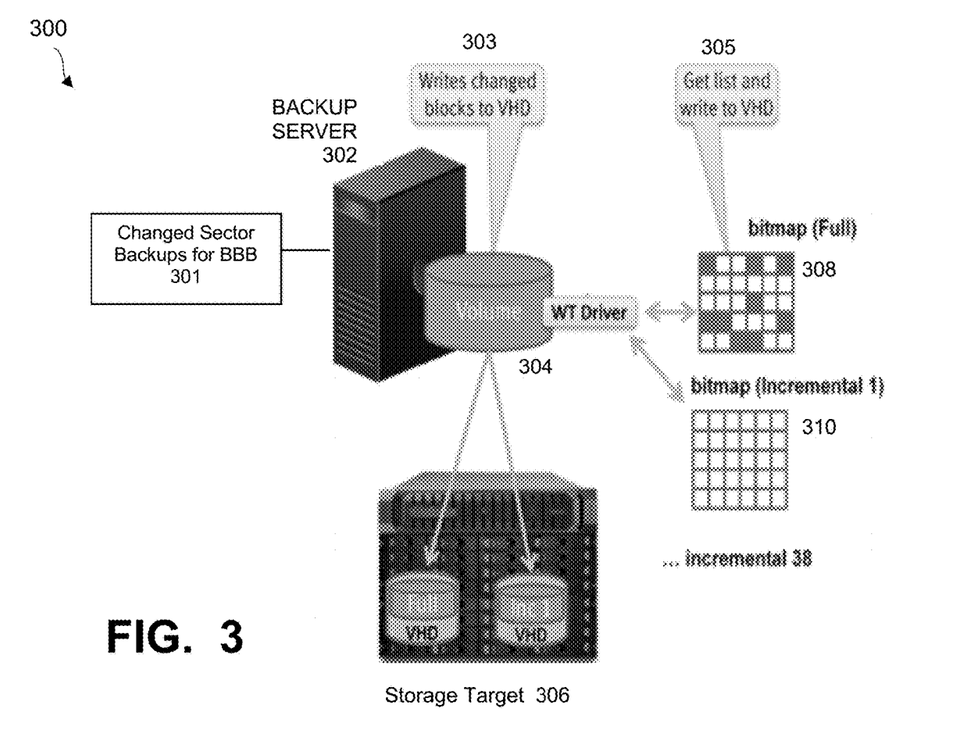
FIG. 3 is a block and flow diagram illustrating a block-based backup process, under some embodiments.

FIG. 3 is a block and flow diagram illustrating a block-based backup process, under some embodiments. FIG. 3 illustrates several steps that are performed on the source data when the block-based backups are triggered for an incremental backup in scheduled backup windows. In system 300, backup server 302 writes changed blocks to the virtual hard disk (VHD), 304. This data is then written to the storage target 306 as a full backup (Full) and the incremental backup (Inc 1). The volume READ for each set of data that has to be backed up is thus stored in storage 306, with the changed blocks written to the VHD 304. The system then create a virtual container/VHDX and fetches the list of extents that have been changed, step 303. The volume communicates through volume driver (e.g., write tracker (WT) driver that manages and controls operations and logging) to generate the full bitmap 308. From the list, the process fetches specific bits that have been changed in each block against the bitmap of the volume from the container, step 305, such as to generate one or more incremental bitmaps 310. The process then replaces the extents that have been changed in the incremental backup by overwriting the blocks as a whole.

For example, for an exchange database with a full backup of 1 GB and an incremental size of 100 MB, the BBB would initially fetch the volume details and create the container. From the container, the extents that have been changed from 90 MB to 200 MB would be identified. Next, from the bitmap that is generated from the container creation, each bit would be identified for a change and the corresponding blocks are overwritten as shown in the FIG. 3.

In general, FIG. 3 illustrates a BBB incremental backup procedure in which the bitmap 308 is the volume map that contains changed blocks that is to be considered for writing to the backup media. The WT driver responsible for managing and controlling write tracker, would see the list of changed blocks from VHD 304 and write to the backup storage target 306.

In present systems, the backup solutions currently utilize virtual synthetic full backups as an effective solution to achieve a lower overhead of additional full backups per restore. This is achieved by merging the full backup at each incremental step and synthesizing a virtual full at every level thereby improving the throughput and mitigating the overhead of additional full backups at each incremental restore. However, there is still a gap in the way mergers of full backups take place during the incremental backups. Embodiments of process 121 address this problem to improve the overall throughput of incremental backups for the BBB backups 120.

As shown in FIG. 3, system 300 includes a changed sector backup process for block-based backups that utilizes the dynamic disk containers, changed data detection in a block, and fixed-size segmentation (FSS) in a conjunction to improve the backup performance. This is used to fill gaps in conventional virtual synthetic full (VSF) backups that are due to the fact that the backup merger was performed for each block write operation, and a differential disk type container was used, which takes extra time to deploy as a temporary container, and the fact that the data written to the storage target was of variable size, which also adds time per data item for the backup. Embodiments of process 121 utilize these potential gaps to gain the lost time back so as to ultimately achieve an efficient backup that provides users with improved backup windows.

Embodiments of process 301 create one dynamic disk container instead of an additional temporary container, and modifies the BAT of this same container. Whenever, there is a new block entry, there would be an entry for the corresponding VHD container offset in the BAT table. Finally, in each changed block, only the changed data is replaced, unlike conventional backups that write the whole changed block irrespective of data changes in a temporary differential disk. This system overwrites only the changed bits in the dynamic disk.

Process 301 thus address the issues of current systems, namely, not achieving short backup windows with tight RPO and RTO for users in a data protection scenario. It does so by overcoming the additional time consumption of conventional backups that contain certain gaps, through ensuring a lower latency in the incremental backups to ensure a smaller backup window.

Embodiments provide a VSF solution that is tightly coupled with Data Domain functionality to synthesize files, using inherent features and filesystem support to enable VSF. This provides a basis to decouple and provide independent backup technology, which improves the overall backup performance using modified BBB technology to back up the changed sectors on the volume.

Process 301 is decoupled from the target device 306 functionality by using copy and overwrite functionality that are the default operations of target device. This makes the system more resilient from target device dependencies and also enables seamless switching from one backup method to other. In addition, the solution would not require a staging delay for the final backup, and provides an on-the-fly merger approach for incremental backups, and does not break the older technology backups.

As shown in FIG. 3, the process of system 300 starts with the BBB driver 302 providing the bitmap 308 for the entire volume of changes to be saved in an incremental backup. The changes are calculated for each file to be backed up by utilizing the volume offsets in the container, where the container is always native to the host where the backup is being performed. A container stream is created and contains the list of incremental extents for each file, which encapsulates the complete file extents and snapshot file handle. The saveset file of the last backup is also cloned using the target device APIs. This cloned backup file is further overwritten with the changes to update the VHDX header, metadata for the new backup. Subsequently, a block start for each incremental extent would be calculated and the BAT table of the cloned backup would be updated with the details. For each incremental block in the extents list, an entry for the block would be checked in the BAT table. If the entry exists, the VHDX offset for the block would be fetched, else, a new block would be created and adds a new entry for the block in the BAT table.

Figure 4:
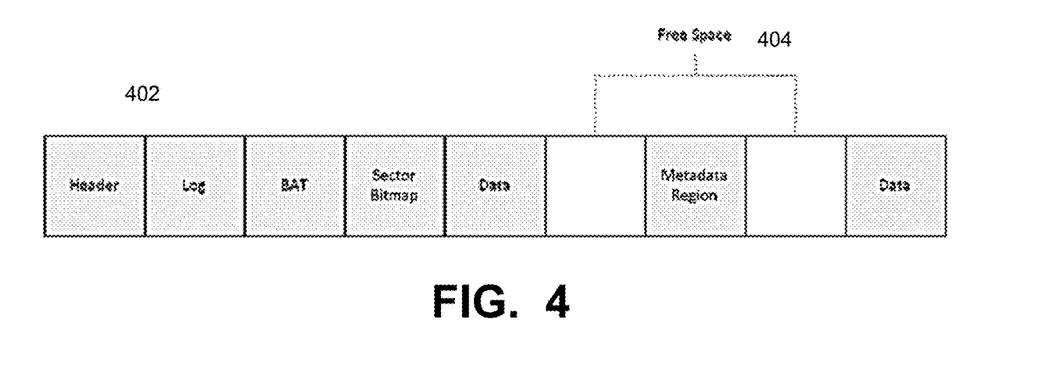
FIG. 4 illustrates a sample virtual hard disk container with empty blocks and as processed by a changed sector backup process, under some embodiments.

FIG. 4 illustrates a sample VHDX container with empty blocks and as processed by a changed sector backup process, under some embodiments. As shown in FIG. 4, container 402 includes several data elements such as a header, log, BAT file, sector bitmap, data and metadata regions. The container may also include some gaps or free space 404 between some regions, such as between certain metadata and data, as shown. Process 301 fills these free spaces 404 to gain back any lost time caused by these gaps.

Embodiments provide several key features, such as cloning the save set from a previous backup, which is superior to creating a temporary differencing container (AVHDX) and then the final VHDX (dynamic disk), as it reduces the latency during backup. Another feature is using a BAT table to get the corresponding block start offset in the previous backup VHDX container, as well as the overwriting only the changed bits in a particular block. Usage of a dynamic disk container mitigates the increase of latency from parental block searches in a differencing container. The use of Fixed Sized Segmentation (FSS) for storage of the backup files in target device realizes lesser fragmentation to reduce latency in consecutive incremental backups during previous backup cloning.

Figure 5:
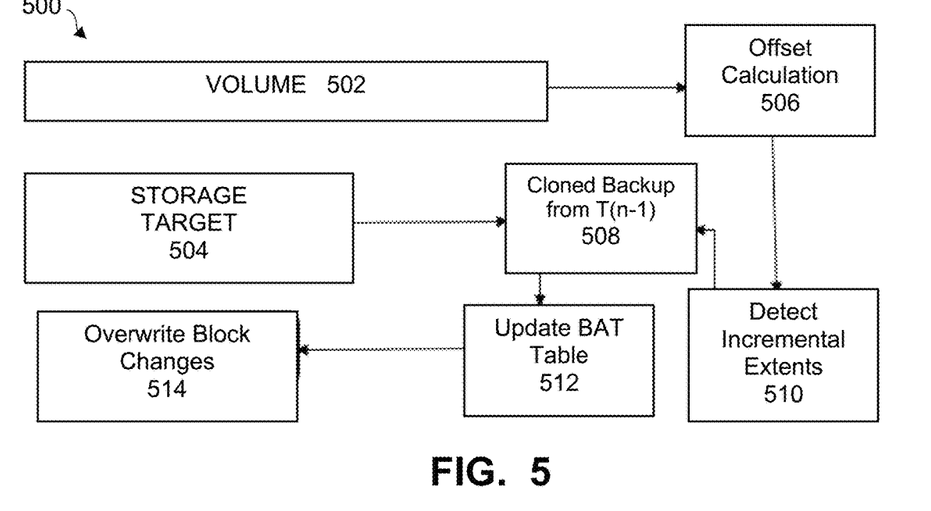
FIG. 5 illustrates an incremental backup lifecycle using changed sector backups, under some embodiments.

FIG. 5 illustrates an incremental backup lifecycle using changed sector backups, under some embodiments. As shown in FIG. 5, the process of system 500 calculates the offsets of a volume of changes 502. The last saveset (i.e., saveset from time T(n-1)) from storage target 504 is cloned 508, and this cloned backup image is used to update the BAT table 512 to overwrite the block changes 514.

The process 500 relies on the calculation of the offset 506 from the cloned backup image 508 in the target device 504. With the offset calculation 506 and list generation, the dynamic VHDX container is generated and the consecutive offset for the changed blocks would be calculated as well. Concurrently, the BAT table 512 in the dynamic VHDX container is be updated with the changed/new blocks and any unchanged are kept empty. Also, there is an iteration that traverses the changed blocks, and find the offset and length for the changed content in each block using the incremental extents 510 calculated earlier (in 506) and container offset received from the BAT table. Finally, with the absolute data that has been changed per block, the clone would be overwritten with only the changed bits per block to synthesis an incremental backup, resulting in an efficient backup.

Overall, system 500 uses a BBB driver to provides a bitmap for the entire volume of changes to be saved in an incremental backup. The changes are calculated for each file to be backed up by utilizing the volume offsets in the container. A container stream is created containing the list of incremental extents for each file, which encapsulates the complete file extents and snapshot file handle. The saveset file of the last backup is cloned using storage target APIs. This cloned backup file is further overwritten with the changes to update a virtual disk header and metadata for the new backup. Subsequently, a block start for each incremental extent is calculated, and the BAT table of the cloned backup is updated with these details. For each incremental block in the extents list, an entry for the block would be checked in the BAT table. If the entry exists, VHDX offset for the block would be fetched, otherwise a new block would be created and a new entry for the block added in the BAT table.

Figure 6:
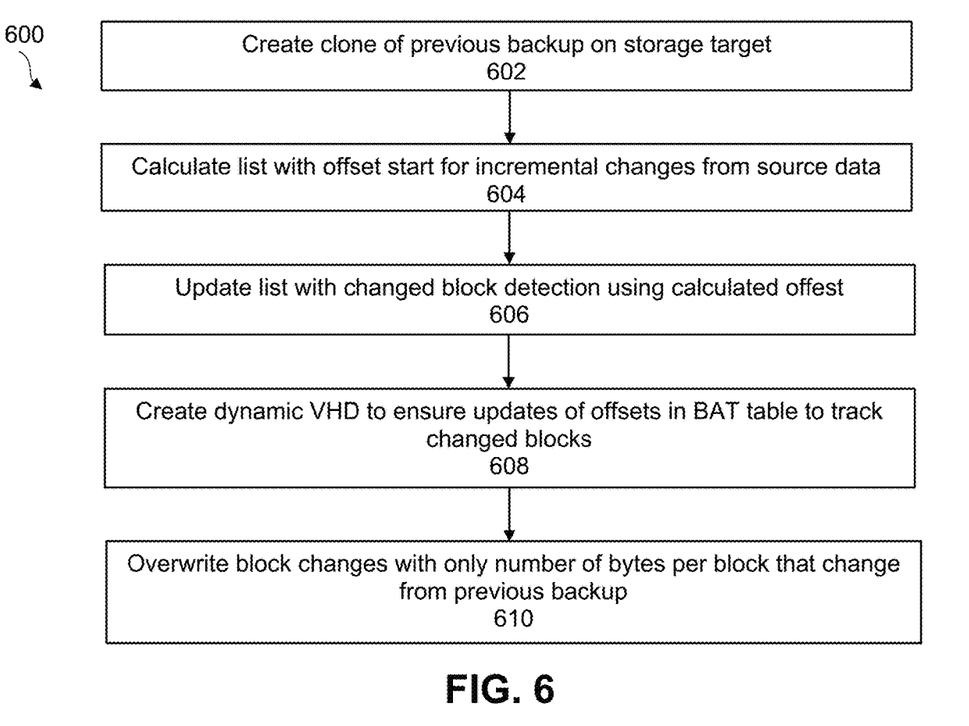
FIG. 6 is a flowchart that illustrates a method of performing changed sector backups for BBB, under some embodiments.

FIG. 6 is a flowchart that illustrates a method of performing changed sector backups for BBB, under some embodiments. Process 600 of FIG. 6 shows a sequence of events that occur during every incremental backup using process 301. Process 600 starts with creating a clone of the previous backup (T(n-1)) on the storage target 504, step 602. It then calculates the list with the offset start point for the possible incremental change from the source data, 604. In step 606, the list is updated with the changed block detection from the offset calculated in 604. The process next creates a dynamic VHDX to ensure a list of offsets be updated in the BAT table to track the changed blocks, 608. Once the changed blocks are noted, total data overwritten would only be the number of bytes per block that have been changed from the previous backup and not the complete block as itself, 610.

The process of FIG. 6 provides several advantages over present systems, such as the usage of dynamic disk containers for snapshot backups rather than using differencing disk containers for these snapshots. Also, there is no need for temporary VHD containers because of the use of a previous backup clone. Fixed-size segmentation (FSS) is used at the storage target, thus eliminating the need to enforce variable-sized segmentation at the target, and such FSS improves replication functionality as it has lesser fragmentation.

Figure 7:
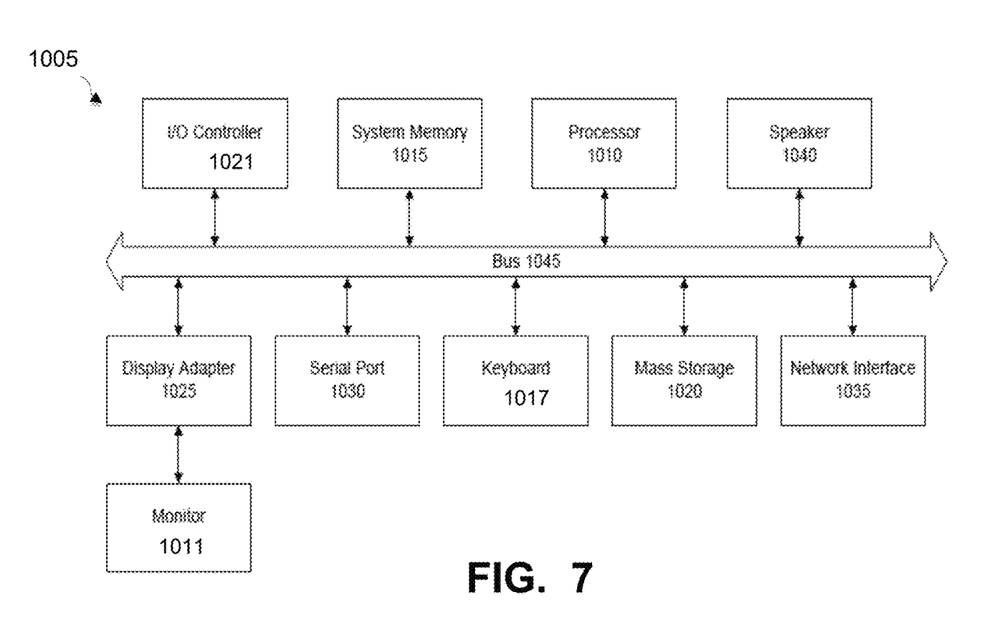
FIG. 7 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 7 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing block-based backups (BBB) to a storage target in a data protection system, the method comprising:
providing a bitmap for an entire volume of changes to files to be saved in an incremental backup;
creating a container stream containing a list of incremental extents for each file, wherein the container stream encapsulates complete file extents and a snapshot file handle;
cloning a backup file of a last backup operation;
overwriting the cloned backup file with the changes to update a virtual disk header and metadata for the incremental backup;
calculating a block start for each incremental extent of the list of incremental extents; and
updating a table of the cloned backup with the calculated block start, wherein the table contains a BAT file comprising an executable batch file.

2. The method of claim 1 wherein the changes are calculated for each file to be backed up by utilizing volume offsets in the container.

3. The method of claim 2 wherein for each incremental block in the extents list, an entry for the block is checked in the table.

4. The method of claim 3 wherein, if the entry exists in the table, a virtual disk offset for the block is fetched, otherwise a new block is created and a new entry for the new block is added in the table.

5. The method of claim 4 further comprising using fixed-size segmentation (FSS) in the storage target to improve replication functionality by reducing data fragmentation.

6. The method of claim 5 wherein the data protection system comprises a PowerProtect Data Domain deduplication backup system.

7. The method of claim 6 wherein the incremental backup follows at least one of a full backup or a previous incremental backup as the last backup operation.

8. The method of claim 1 wherein the method fills gaps in a backup saveset present in virtual full synthetic backups and caused by performing mergers for each block write operation and using differential disk type containers.

9. A computer-implemented method of performing block-based backups (BBB) of files to be saved to a storage target in a data protection system, the method comprising:
creating only a single dynamic disk container to hold a list of incremental extents for each file of the files;
cloning a backup file of a last backup as a clone to be overwritten with changes by an incremental backup following the last backup;
modifying a table of the single dynamic disk container by adding an entry for a corresponding virtual disk container offset in the table for a new entry, wherein the table contains a BAT file comprising an executable batch file; and
replacing, in each changed block, only changed data so that only the changed bits in the dynamic disk container are overwritten.

10. The method of claim 9 further comprising:
creating a container stream containing a list of incremental extents for each file, wherein the container stream encapsulates complete file extents and a snapshot file handle;
overwriting the clone with the changes to update a virtual disk header and metadata for a new backup generating the new entry;
calculating a block start for each incremental extent of the list of incremental extents; and
updating the table of the clone with the calculated block start.

11. The method of claim 10 wherein the changes are calculated for each file to be backed up by utilizing volume offsets in the container.

12. The method of claim 11 wherein for each incremental block in the extents list, an entry for the block is checked in the table.

13. The method of claim 12 wherein, if the entry exists in the table, a virtual disk offset for the block is fetched, otherwise a new block is created and a new entry for the new block is added in the table.

14. The method of claim 13 further comprising using fixed-size segmentation (FSS) in the storage target to improve replication functionality by reducing data fragmentation.

15. The method of claim 14 wherein the data protection system comprises a PowerProtect Data Domain deduplication backup system, and wherein the incremental backup follows at least one of a full backup or a previous incremental backup as the last backup operation.

16. The method of claim 9 wherein the method fills gaps in a backup saveset present in virtual full synthetic backups and caused by performing mergers for each block write operation and using differential disk type containers.

17. A system for performing block-based backups (BBB) to a storage target in a data protection system, the method comprising:
a container driver providing a bitmap for an entire volume of changes to files to be saved in an incremental backup;
a hardware-based container containing a list of incremental extents for each file, wherein a container stream encapsulates complete file extents and a snapshot file handle; and
a processor-based component cloning a backup file of a last backup operation as a clone to be overwritten with the changes to update a virtual disk header and metadata for the incremental backup, calculating a block start for each incremental extent of the list of incremental extents, and updating a table of the cloned backup with the calculated block start, wherein the table contains a BAT file comprising an executable batch file.

18. The system of claim 17 wherein the changes are calculated for each file to be backed up by utilizing volume offsets in the container, and further wherein for each incremental block in the extents list, an entry for the block is checked in the table.

19. The system of claim 18 wherein, if the entry exists in the BAT table, a virtual disk offset for the block is fetched, otherwise a new block is created and a new entry for the new block is added in the table.

20. The system of claim 19 further comprising using a fixed-size segmentation (FSS) component in the storage target to improve replication functionality by reducing data fragmentation, and wherein the data protection system comprises a PowerProtect Data Domain deduplication backup system, and further wherein the incremental backup follows at least one of a full backup or a previous incremental backup as the last backup operation.

* * * * *